Dec. 26, 1944.  M. M. CULVER  2,366,006
DILUTION VALVE
Filed Aug. 22, 1942  2 Sheets-Sheet 1

Inventor
Merlyn M. Culver,
By C. B. Stevens
Attorney

Dec. 26, 1944.  M. M. CULVER  2,366,006
DILUTION VALVE
Filed Aug. 22, 1942   2 Sheets-Sheet 2
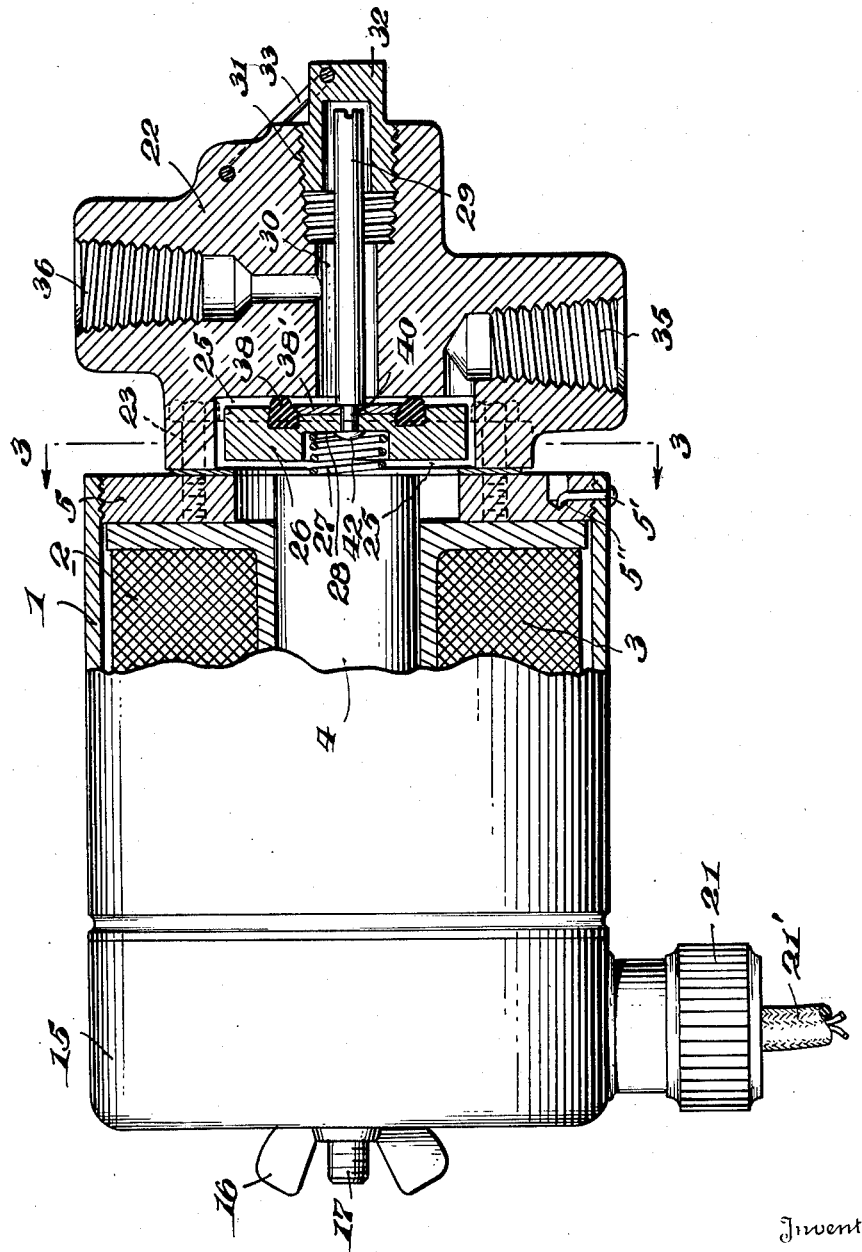
Inventor
Merlyn M. Culver,
By C. B. Stevens
Attorney Patented Dec. 26, 1944

2,366,006

UNITED STATES PATENT OFFICE 2,366,006

DILUTION VALVE

Merlyn M. Culver, Dayton, Ohio, assignor to United Aircraft Products, Inc., Dayton, Ohio, a corporation of Ohio Application August 22, 1942, Serial No. 455,817

7 Claims. (Cl. 137—139)

This invention relates to dilution valves, employed in oil dilution systems for airplanes, and more particularly a valve of the magnetic type.

The primary object of the invention is to provide an electrically actuated or electro-magnetically controlled valve which upon opening permits injection of gasoline or other diluent into the oil system of an airplane to thin the oil.

The invention has for a further object a structure of the type set forth wherein the valve is readily accessible for manual operation should this be necessary, or desirable.

Further the invention has for its objective to provide a valve so constructed and confined or housed to be repellant to cold flow, and which also eliminates the necessity of a special type of seat therefor.

Still further the invention aims to provide a valve which is positive in action, and which minimizes failure in operation.

The invention also aims to provide a valve structure wherein the parts can be easily and quickly assembled, and which is of economical and compact construction.

The invention has still further and other objectives, later set forth and of themselves manifested in the course of the following description.

In the drawings:

Figure 2 is a section on line 2—2 of Figure 1; and

Figure 1:
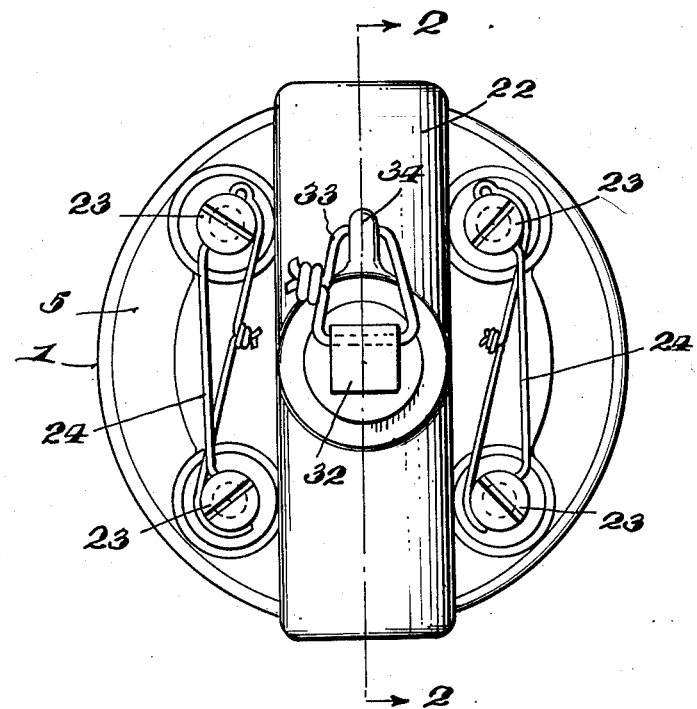
Figure 1 is a front elevation of the invention.
Figure 3:
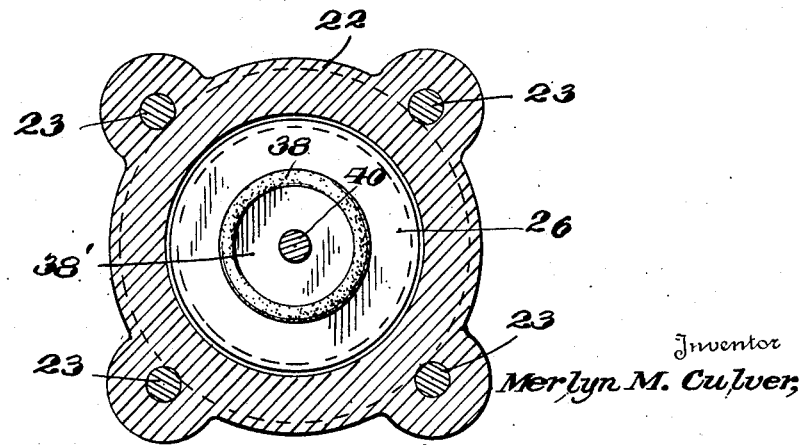
Figure 3 is a section on line 3—3 of Figure 2.

In proceeding in accordance with the present invention, a casing 1, is provided within which is located an electro-magnet 2 having the usual solenoid coil 3, and a stationary core 4. The casing 1 is closed at its front end by a ring 5 preferably threaded thereinto and abutting the front end of the electro-magnet. A locking pin 5' is employed to lock the ring 5, against rotation and has its end 5" bent into locked position as depicted.

A head 15 closes the rear end of the casing and is removably secured thereto by a wing or thumb nut 16 threaded onto a threaded stem 17 which is formed on the stationary core 4.

A tubular member 21 is carried by cap 15 and houses wires 21', forming splicing connections that lead from a suitable source of electrical supply (not shown) to energize the coil. Also, any suitable switch (not shown) is included in the circuit whereby to energize and deenergize the electro-magnet at the will of the operator. However, an automatic switch can be employed.

A head 22 is secured to the casing by means of bolts 23 that are threaded into the ring 5 of the casing and held against accidental rotation by the tie or lock wires 24, as illustrated in Figure 1. The head is formed with a valve chamber 25 that has an open front which confronts the front end of the core 4. A valve 26 of disk form, constituting the armature of the electro-magnet, which will be herein referred to as a "valve," is disposed in the chamber 25 and is biased to closed position by a coil spring 27 which latter at one end engages the front end of the core 4 and at its opposite end seats in a cutout 28 formed in the rear side face of the valve. It is to be particularly noted that the spring 27 holds the rear face of the valve, when the latter is closed, spaced from the front of the valve chamber and its periphery spaced from the circumferential wall of the valve chamber so that the diluent under pressure upon entering such space will act against the rear face of the valve to augment the action of the spring, and thus more firmly hold the valve in its seated or sealed position.

A stem 29 is fixedly secured to the valve and extends through a longitudinal passage 30 formed in the head. The stem has its periphery in spaced relation to the walls defining the passageway thereof to provide for the flow of gasoline along and about the stem. The inner end of the passageway communicates with the valve chamber while its outer end 31 is enlarged and threaded as shown to receive a plug 32 which closes and seals the outer end of the passageway.

For the purpose of holding the plug against accidental rotation a tie or locking wire 33 is employed and which extends through the plug and through a boss 34, shown in Figure 1, and which is formed on the head.

An inlet 35 for the gasoline or diluent is formed on the head and communicates with the valve chamber while an outlet 36, likewise formed on the head, communicates with the passageway 30 and is spaced from and located forwardly of the inlet as depicted in Figure 2.

The valve is so confined in its chamber and also provided with a synthetic sealing ring 38 whereby same will be resistant to cold flow. The synthetic ring which seats against the back wall of the chamber 25, is inset in the outer side face of the valve and is beveled on its inner circumference for engagement with the complementary beveled periphery of the disk 38', by means of which the ring is held in position. The disk is secured on the valve stem 29 by reducing the inner end portion thereof at 40 and upsetting its extremity at 42 to hold the disk, between the shoulder resultant from reduction of the stem end, and the upset extremity 42 thereof.

In some instances it may be desirable or necessary to manually operate the valve to unseat and thereby open same, and accordingly the outer or free end of the stem 29 is disposed adjacent to the outer end of the head 22. Therefore by removal of the plug 32, the stem 29 is rendered accessible for ready operation.

In operation, the diluent is admitted under pressure from a source of supply (not shown) into the inlet 35, and enters the valve chamber where it acts against the rear side of the valve and assists the spring to hold the valve firmly seated.

Upon opening of the valve by energizing the electro-magnet, or manual manipulation thereof, the diluent then enters the passageway and finally egresses through the outlet 36 from which latter it is conveyed to, or injected into, the oil system.

Upon release of the valve, the spring 27 and the pressure of the diluent restores the valve to and holds same in closed position, thus shutting off the supply of the diluent to the passageway.

By virtue of the use of a disk-like valve having a ring, which projects outwardly from one face thereof, as shown and described, the ring seats against the flat wall of the chamber 25 and thus dispenses with the necessity of providing a special seat for the valve, and a more compact structure thereby provided.

It is to be understood that the herein disclosed embodiment of the invention is by way of example and that various changes in shape, size and arrangement or combination of the parts may be resorted to without departing from the spirit of the invention, as announced by and which fall within the scope of the following claims.

What is claimed is:

1. In a dilution valve device or the like, a casing, a solenoid in the casing having a coil and a stationary core in the coil, electrical circuit forming means for the coil, a cap closing one end of the casing, and having an outlet for the circuit forming means, means to secure the cap in position, a head secured to the opposite end of the casing and having a valve chamber open at one side and which latter confronts the said opposite end of the casing, a valve in the valve chamber biased to closed position, and confronting the adjacent end of the core, said head having an inlet communicating with the valve chamber, a longitudinal passageway having its outer end extending through the outer end of the head, and its inner end communicating with the valve chamber and an outlet communicating with the passageway; a stem connected to the valve and disposed in the passageway and spaced from the walls of the latter to provide for the flow of fluid along and about the stem, means for closing the outer end of the passageway, and means to energize the coil for effecting opening of the valve.

2. In a dilution valve device or the like, a casing, a solenoid in the casing having a coil and a stationary core in the coil, electrical connections for the coil, a cap closing one end of the casing and enclosing the connections and having an outlet for the wires of the connections, means to removably secure the cap to one end of the core, a head secured to the opposite end of the casing and having a valve chamber open at one side and which latter confronts the said opposite end of the casing, a valve in the valve chamber, confronting the adjacent end of the core, a spring engaging said end of the core and the valve to urge the latter to closed position, said head having an inlet communicating with the valve chamber; a longitudinal passageway having its outer end extending through the outer end of the head, and its inner end communicating with the valve chamber and an outlet communicating with the passageway, a stem connected to the valve and disposed in the passageway and spaced from the walls of the latter to provide for the flow of fluid along and about the stem, means for closing the outer end of the passageway, and means to energize the coil and thereby effect opening of the valve.

3. In a dilution valve device or the like, a casing, a solenoid in the casing having a coil and a stationary core in the coil, an electrical connection for the coil, a cap closing one end of the casing and enclosing the connection and having an outlet for the wires of the connection, means to secure the cap in position, a head secured to the opposite end of the casing and having a valve chamber open at one side and which latter confronts the said opposite end of the casing, a valve in the valve chamber biased to closed position and confronting the adjacent end of the core, said head having an inlet communicating with the valve chamber; a longitudinal passageway having its outer end extending through the outer end of the head, and its inner end communicating with the valve chamber and an outlet communicating with the passageway, a stem connected to the valve and disposed in the passageway and spaced from the walls of the latter to provide for the flow of fluid along and about the stem, means to energize the coil and thereby open the valve, and displaceable means for closing the outer end of the passageway whereby upon displacement to render the stem of the valve accessible for manual operation.

4. In a dilution valve device or the like, a casing, a solenoid in the casing having a coil and a stationary core in the coil, electrical connection for the coil, a cap closing one end of the casing and enclosing the connections and having an outlet for the wires of the connections, means to secure the cap to one end of the casing, a head secured to the opposite end of the casing and having a valve chamber open at one side and which latter confronts the said opposite end of the casing, a valve in the valve chamber biased to closed position, said head having an inlet communicating with the valve chamber; a longitudinal passageway having its outer end enlarged and extending through the outer end of the head, and its inner end communicating with the valve chamber and an outlet communicating with the passageway, a stem connected to the valve and disposed in the passageway, and spaced from the walls of the latter to provide for the flow of fluid along and about the stem, means to energize the coil, displaceable means for closing the outer end of the passageway composed of a plug in the enlarged outer end of the passageway, and means to releasably lock the plug in closed position.

5. In a dilution valve device or the like, a casing, an electro-magnet in the casing including a coil and a stationary core in the coil, a member secured to the casing and having a valve chamber open at one side, said member also having an inlet and an outlet for fluid communicating with said valve chamber, said open side of the valve chamber confronting one end of the core and lying adjacent thereto, a combined inlet and outlet control valve and armature for said electro-magnet comprising a disk like member in said valve chamber having its rear face confronting and lying adjacent to said end of the core, said combined valve and armature having therein a recess in its rear face, and means to bias the valve to closed position comprising a coil spring engaged at one end with said end of the core and having its opposite end disposed in said recess.

6. A valve device comprising a casing and a head secured together in end to end relationship, said head having a valve chamber in its end adjacent to said casing and also having therein fluid inlet and outlet ducts communicating with said valve chamber, a valve in said valve chamber movable toward said casing to an open position establishing communication between said ducts and movable in the opposite direction to a closed position denying communication between said ducts, yieldable means tending constantly to move said valve to its closed position, an electro-magnet in said casing comprising a winding and a stationary core, said valve constituting an armature so that it is attracted to open position by said electro-magnet upon energization of the latter and is released to be moved to closed position by said yieldable means when said electro-magnet is deenergized, said head having a passageway extending therethrough from its end remote from said casing to said valve chamber to afford access to said valve, a stem carried by the valve and extending into said passageway for manual manipulation to open the valve, and removable means normally closing the outer end of said passageway.

7. A valve device comprising a casing and a head secured together in end to end relationship, said head having a valve chamber in its end adjacent to said casing and also having therein a passageway extending from its end remote from said casing to said valve chamber, said head further having therein a fluid inlet duct communicating with said valve chamber and a fluid outlet duct communicating with said passageway, a valve in said valve chamber movable toward said casing in an open position establishing communication between said inlet duct and said passageway and movable in the opposite direction to a closed position denying communication between said inlet duct and said passageway, yieldable means tending constantly to move said valve to its closed position, an electro-magnet in said casing comprising a winding and a stationary core, said valve constituting an armature so that it is attracted to open position by said electro-magnet upon energization of the latter and is released to be moved to closed position by said yieldable means when said electro-magnet is deenergized, said passageway affording access to said valve, a stem carried by the valve and extending into said passageway for manual manipulation to open the valve, and removable means normally closing the outer end of said passageway.

MERLYN M. CULVER.